Patented Mar. 29, 1932

1,851,808

UNITED STATES PATENT OFFICE

ROBERT CALVERT, OF WILMETTE, ILLINOIS, ASSIGNOR, BY MESNE ASSIGNMENTS, TO CELITE CORPORATION, OF NEW YORK, N. Y., A CORPORATION OF NEW YORK

FILTRATION MATERIAL

No Drawing. Application filed October 28, 1924, Serial No. 746,450. Renewed September 19, 1927.

My invention relates to a composition and process for the manufacture of a filtration material or filter-aid.

When lime, diatomaceous earth (sometimes called kieselguhr or infusorial earth) and water are mixed, a very remarkable change occurs. The suspension in water of diatomaceous earth, which alone has a muddy appearance and settles relatively slowly, is so changed by combination with the lime that the larger particles become flaky, the very fine particles disappear altogether, and the resulting flocculent matter settles rapidly to leave a clear supernatant liquor.

As disclosed in my co-pending application 678,029 filed December 1, 1923, it is highly probable that the reaction consists in a combination of the lime hydrate with the finely divided and therefore highly reactive silica to form a hydrated calcium silicate and gelatinous coating on the surface of the minute particles.

Possibly because of the removal of the fine particles, possibly for other reasons, the diatomaceous earth which has been so treated with lime permits of a very rapid flow of liquids through it. Water, for example, can be pumped through a filter cake of this material as rapidly as through certain grades of fine sand. A high rate of flow is found also in the case of raw sugar solutions but, unfortunately, the fine, suspended particles in the sugar solution are not retained satisfactorily by the treated earth.

The objects of my invention are to provide a composition and process of manufacture of matter containing lime-treated kieselguhr which can be used to give a satisfactory clarification of liquids filtered through it, such as aqueous solutions of raw cane sugar, and also to develop a use for such industrial wastes as the filter cakes of sugar refineries.

I have discovered that a composition comprising lime-treated kieselguhr, and the fine particles obtained from the filtration of raw sugar through kieselguhr, gives an excellent filtration material. It is less costly per pound than kiselguhr, since the fresh lime-treated kieselguhr is partly replaced by the filter cake which is a waste product. Also, my new composition is superior to lime-treated kieselguhr alone in giving much better clarification of the liquid being filtered, as illustrated quantitatively below.

The kieselguhr used in a typical experiment was a powder of the grade known by the trade name "Filter-Cel". The filter cake was some obtained from a large cane sugar refinery; it consisted of "Filter-Cel" contaminated with the impurities retained during the filtration of so-called "washed sugar solution". The lime was hydrated lime, fairly well powdered. The sugar solution used for testing was made by dissolving 60 parts by weight of raw sugar in 40 parts water at 90° C. The actual filtration tests were made at 30 lbs. pressure per sq. in., and at temperatures of 85 to 88° C. at the beginning of the filtration cycle and 76 to 80° C. at the end of the cycle. The volumes of filtrate obtained in a given time have been calculated as gallons per sq. ft. of filter area.

Three tests are given for comparison. In each there was used approximately 20 lbs. kieselguhr per ton of raw sugar. For test No. 1 the kieselguhr was untreated. For test No. 2 one part kieselguhr by weight was mixed with one-half part of hydrated lime and forty parts hot water, and the mixture allowed to stand at approximately 90° C. for 5 hours previous to use. For test No. 3, the same procedure was followed except that one-fourth of the kieselguhr was replaced, before the treatment with lime, by sugar refinery filter cake. The filtration data are tabulated below:—

| Test No. | 1 | 2 | 3 |
|---|---|---|---|
| Filtration material | Kieselguhr 1 part | Kieselguhr 1 part | Kieselguhr ¾ part, filter cake, ¼ part |
| Treatment of filtration material | Untreated | Lime treated | Lime treated |
| Gallons filtrate per sq. ft. of filter area, in first 1 minute | 0.90 | 2.43 | 1.74 |
| Gallons filtrate per sq. ft. of filter area, in first 2 minutes | 1.22 | 3.70 | 2.70 |
| Gallons filtrate per sq. ft. of filter area, in first 5 minutes | 2.14 | 6.78 | 4.90 |
| Gallons filtrate per sq. ft. of filter area, in first 10 minutes | 2.96 | 9.70 | 7.46 |
| Gallons filtrate per sq. ft. of filter area, in first 15 minutes | 3.69 | ---------- | 9.04 |
| Filtrate became clear after the beginning of the cycle, in minutes | 1.5 | Never | 4.0 |
| Thickness of filter cake obtained | 2/16 in. | 10/16 in. | 7/16 in. |

Filtration test No. 2 was discontinued after 10 minutes. At that time the liquor in the tank supplying the filter had all been forced through the filter cake, and the filter cake had formed to a thickness of ten-sixteenths of an inch, or more than would be allowable in those commercial filter presses in which a space 1 inch across is provided for the combined thicknesses of cakes on each side of the filter leaf. The liquor which should have been the clear filtrate was still coming through unclarified at the end of this test, although 9.7 gallons liquor had been forced through per square foot of filter area; in test No. 3, on the other hand, a clear filtrate was obtained in 4 minutes when approximately 4 gallons liquor had been put through for each square foot.

The lime treated mixture of kieselguhr and filter cake (test No. 3) gives clarity of filtrate within a permissible time. It gives also a rate of filtration so much faster than does untreated kieselguhr (test No. 1) that it is possible to reduce the quantity of total aid used per ton of sugar, and thus reduce further the cost of filtration material, and still obtain a rate of flow equal to that of untreated kieselguhr. For example, I have found 1% of kieselguhr, untreated, on the weight of raw sugar, to give a rate of flow not equal to that obtained with only ⅓% of a mixture of 3 parts kieselguhr and 1 part filter cake, the mixture having been lime-treated as described above. Here my composition has made possible a saving of 75% of fresh kieselguhr.

Many variations of details will undoubtedly be necessary to correct for the varying compositions of the filter cake in various industries, or even in different cane sugar refineries. The one essential feature of my invention is the inclusion with lime-treated kieselguhr of sufficient fine particles to give a filtration material of satisfactory clarifying power. The fine particles may be derived from such filter press cake as described. In that case it may be assumed that the lime treatment affects the kieselguhr of the cake much as in the case of fresh kieselguhr, and that the effective fine particles left in the lime-treated mixture are those derived from the impurities of raw sugar. It follows that fine particles may be had in lime-treated kieselguhr by mixing in with the lime-treated kieselguhr fine clay, or even fresh, finely powdered kieselguhr. I have, in fact, obtained encouraging results by mixing such fresh kieselguhr into lime-treated kieselguhr, that is, subsequent to the lime treatment of the larger portion of the kieselguhr. Such results were not as favorable, however, as those obtained by the admixture of filter cake into kieselguhr, and then lime-treating the mixture. There remains still a third method which I have actually used in carrying out my invention; I have used lime-treated kieselguhr twice and thrice, as a filter aid for 60° Brix raw sugar solutions at 85° C. The first filtration is unsatisfactory. Too long a time is required to obtain a clear filtrate. On reuse of the cake, however, finely divided impurities from the raw sugar solutions are present, and clarity of filtrate is obtained before the pressure filter becomes choked with the bulky filter cake.

The lime treatment which is referred to frequently in the specification and claims is the process of allowing the reaction to occur in a warm mixture comprising powdered kieselguhr, lime and water until the larger part of the lime has been combined with the silica of the kieselguhr. Sufficient water is preferably used to ensure the fluidity of the mixture at all times. The reaction is expedited by keeping the materials in good contact, as by agitation, and by the nearly universal expedient, heat. The reaction is substantially complete in 3 hours at temperatures of 90° C. or higher. The amount of lime (calculated at CaO) should be not less than 10 nor more than 120% of the weight of the kieselguhr; I prefer to use approximately half as many pounds of lime as of kieselguhr or of the mixture of kieselguhr and filter cake. The filter cake which is most suitable is that obtained by filtering raw cane sugar solutions through kieselguhr and then washing with water to remove all but traces of sugar. Unless otherwise specified, the term filter cake, as used in the specifications and claims, refers to the solid material left in a filter through which has been filtered a suspension of kieselguhr in an impure sugar solution, such as a solution of raw cane sugar or molasses.

When desirable, the removal of the larger part of the excess of water used in lime-treating may be effected by centrifuging, after the completion of the reaction.

I claim:—

1. A composition of matter for use as a filtration material comprising a mixture of kieselguhr and filter cake, said mixture having been lime-treated at a temperature suitable for the inter-action of the lime and kieselguhr.

2. A composition of matter adapted for use as a filtration material which comprises a mixture of 3 parts kieselguhr and 1 part filter cake, said mixture having been lime-treated at a temperature suitable for the inter-action of the lime and kieselguhr.

3. A composition of matter adapted for use as a filter-aid which comprises a mixture of 3 parts kieselguhr, 1 part filter cake, and 2 parts lime, said ingredients having been kept warm and well mixed, in the presence of an excess of water, until substantially all of the lime has been combined with the other ingredients of the mixture.

4. A filter-aid comprising lime-treated kieselguhr mixed with at least one-fourth its weight of other solid substances having a smaller average size of particle than those of the lime-treated kieselguhr.

5. The process of manufacturing a filter aid which comprises warming an intimate mixture of water, in quantity sufficient to ensure the fluidity of the mixture at all times, kieselguhr, lime and another solid material which leaves, after the completion of the treatment, particles smaller in size than those left by the kieselguhr, until substantially all the lime has been chemically combined with the other ingredients of the mixture.

In testimony, that I claim the foregoing as my own, I have hereto affixed my signature.

ROBERT CALVERT.